United States Patent
Yelvington et al.

(10) Patent No.: US 10,654,009 B1
(45) Date of Patent: May 19, 2020

(54) SPOUTED BED WITH VENTURI DRAFT TUBE AND METHOD FOR IMPROVED GAS-SOLID CONTACTING

(71) Applicant: Mainstream Engineering Corporation, Rockledge, FL (US)

(72) Inventors: Paul E. Yelvington, Rockledge, FL (US); Nicholas R. Schwartz, Rockledge, FL (US); Michael J. Blaise, Melbourne, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 149 days.

(21) Appl. No.: 15/906,299

(22) Filed: Feb. 27, 2018

(51) Int. Cl.
*B01F 3/12* (2006.01)
*B01J 2/00* (2006.01)
*B01F 5/04* (2006.01)
*B01J 2/16* (2006.01)

(52) U.S. Cl.
CPC ........ *B01F 5/043* (2013.01); *B01F 2003/125* (2013.01); *B01F 2215/0431* (2013.01); *B01J 2/006* (2013.01); *B01J 2/16* (2013.01)

(58) Field of Classification Search
CPC ..... B01F 5/043; B01F 2003/125; B01J 2/006; B01J 2/16
USPC ........................................ 118/303
See application file for complete search history.

(56) References Cited

U.S. PATENT DOCUMENTS

| 2,218,880 | A | * | 10/1940 | Hanson | ............ | B01D 46/10 134/102.1 |
| 3,110,626 | A | * | 11/1963 | Larson | ............ | C09K 11/00 118/303 |
| 3,242,586 | A | | 3/1966 | Peterson | | |
| 4,117,801 | A | * | 10/1978 | Dannelly | ............ | A01C 1/08 118/20 |
| 4,190,622 | A | * | 2/1980 | Landis | ............ | B01J 2/04 264/14 |
| 4,349,967 | A | * | 9/1982 | Jones | ............ | B01J 8/245 34/102 |
| 4,373,272 | A | | 2/1983 | Jones et al. | | |
| 4,577,972 | A | | 3/1986 | Shuck et al. | | |

(Continued)

FOREIGN PATENT DOCUMENTS

| CN | 200720123543 | 1/2008 |
| CN | 200920284861 | 1/2011 |

(Continued)

OTHER PUBLICATIONS

Altzibar, H.; Lopez, G.: Olazar, M.; Bilbao, J. In Study of the Minimum Spouting Velocity in a Draft-tube Conical Spouted Bed, The 13th International Conference on Fluidization—New Paradigm in Fluidization Engineering, 2010.

(Continued)

*Primary Examiner* — Umashankar Venkatesan
(74) *Attorney, Agent, or Firm* — Michael W. O'Neill, Esq.

(57) ABSTRACT

A Venturi draft tube spouted bed and method are disclosed that enables scale-up with small particles and improves heat and mass transfer by increasing material turnover rate. A Venturi-style eductor has been incorporated into the spouted bed draft tube to provide suction at the bottom of the bed to better entrain material and reduce the propensity for dead zones at the bottom of the narrow conical section.

5 Claims, 4 Drawing Sheets

(56) References Cited

U.S. PATENT DOCUMENTS

| | | | | |
|---|---|---|---|---|
| 4,858,552 | A * | 8/1989 | Glatt | B01J 2/16 427/213 |
| 4,877,397 | A | 10/1989 | Tatebayashi et al. | |
| 5,447,567 | A * | 9/1995 | Tanaka | B01J 2/006 118/303 |
| 5,480,617 | A * | 1/1996 | Uhlemann | B01J 2/16 118/DIG. 5 |
| 5,635,051 | A * | 6/1997 | Salas-Morales | C25C 1/16 205/560 |
| 5,925,290 | A | 7/1999 | Hills | |
| 6,193,858 | B1 | 2/2001 | Hradil et al. | |
| 8,313,704 | B2 | 11/2012 | Ogawa et al. | |
| 9,181,509 | B2 | 11/2015 | Bland et al. | |
| 9,598,653 | B2 | 3/2017 | Bland et al. | |
| 2006/0130748 | A1 * | 6/2006 | Bender | B01J 2/16 118/62 |
| 2010/0093408 | A1 | 8/2010 | Jameson | |
| 2010/0311923 | A1 | 12/2010 | Sato et al. | |
| 2014/0054011 | A1 * | 2/2014 | Liu | C10J 3/86 165/104.11 |
| 2019/0177184 | A1 * | 6/2019 | Averbeck | B01D 24/36 |

FOREIGN PATENT DOCUMENTS

| | | |
|---|---|---|
| CN | 201420594167 | 1/2015 |
| CN | 201610627509 | 12/2016 |
| ES | 506250 A | 3/1987 |
| JP | 20430286 A | 9/1994 |

OTHER PUBLICATIONS

A Study of Venturi Tubes; Proceedings of the 2012 20th International Conference on Nuclear Engineering; collocated with the ASME 2012 Power Conference; ICONE20-POWER2012, Jul. 30-Aug. 3, 2012, Anaheim, California, USA; Richard L. Wakeland, P.E., Fluidic Techniques, Mansfield, Texas, USA.

Powder Technology; Experimental study on flowcharacteristics and pressure drop of gas—coal mixture through venturi, Kai Liu, Haifeng Lu, Xiaolei Guo, Xiaolin Sun, Shunlong Tao, Xin Gong; © 2014 Elsevier B.V. All rights reserved.

ScienceDirect; Study of the evolution of particles size distributions and its effects on the oxidation of pulverized coal. Santiago Jiménez, Javier Ballester. (Elsevier).

* cited by examiner

Fig. 1 – PRIOR ART

SPOUTED BED WITH VENTURI DRAFT TUBE AND METHOD FOR IMPROVED GAS-SOLID CONTACTING

STATEMENT REGARDING FEDERALLY SPONSORED RESEARCH OR DEVELOPMENT

This invention was made with Government support under grant DE-SC0017108 awarded by the U.S. Department of Energy. The Government has certain rights in the invention.

BACKGROUND AND SUMMARY OF THE INVENTION

The present invention relates to an apparatus and a method for improved gas-solid (or fluid-solid) contacting. More specifically, the present invention relates to a spouted bed containing a novel draft tube geometry to improve the ease of scaling up of the bed. Our improved spouted bed and method allow for applications over a range of particle size, temperature, and vessel geometry.

Spouted beds have the potential to be a near-ideal solid-gas contactor, especially with a few proposed design changes to accommodate a wide range of applications. An example use of a spouted bed is the desorption of mercury species from pulverized coal into a hot gas stream. However, the inlet diameter of prior-art conical-cylindrical spouted beds must be less than about 25 times the particle diameter for good spouting flow behavior. For pulverized coal (diameter roughly 100 μm), this would lead to an unacceptable scale-up restriction for a coal-fired power plant. The addition of a draft tube in the spouted bed has been shown to alleviate this issue and assist in increasing throughput.

A Venturi draft tube spouted bed (VDTSB) can be used to enable equipment scale-up with small particles and to improve heat and mass transfer by increasing the material turnover rate. In a spouted bed, the solids are quickly carried up in a high-velocity gas jet, ejected in a fountain in the freeboard region of the bed, and slowly return back to the bottom before repeating the cycle. Mass transfer is poor in the annular portion of the bed that is settling back to the bottom, and therefore it is desirable to shorten that portion of the cycle and increase the turnover rate and exposure to the jet and fountain where mass transfer is high.

The VDTSB incorporates an eductor into the draft tube to provide suction at the bottom of the bed to better entrain material and reduce the propensity for bridging and dead zones at the bottom of the narrow conical section. This is done with a Venturi shaped nozzle in the inlet of the draft tube. Low pressure, high velocity fluid provides suction on the surrounding particles as it enters the Venturi throat which aids in the entrainment of the particles of the fluid stream. The Venturi nozzle section contains a converging section, a throat, and a diverging section, where the low pressure, high velocity fluid/particle mixture recovers its original static pressure and velocity. The main advantages of this approach are robustness, process scalability, and compatibility with a wide range of solid particle diameters, and enhanced heat and mass transfer.

Spouted beds are a way of contacting relatively coarse particles with a jet of fluid (usually air) that are characterized by relatively low pressure drop, good solid-gas contacting leading to good heat and mass transfer, and low tendency for segregation of particles based on size (and shape). Spouted bed vessels are usually cylindrical with a truncated cone at the bottom. An upward jet of fluid enters the tip of the cone. The high velocity in the jet entrains the particles in a central upwelling spout region. The particles in the spout are carried up beyond the bed in a fountain and then rain back down on the dense annular bed region surrounding the spout. The particles (and some gas) are transported downward, countercurrent to the spout, in the dense annular region before being re-entrained in the spout to repeat the cycle. The spouted bed can be operated in a batch mode or continuously with an inlet and outlet arranged (usually) with the inlet in the freeboard region above the bed and the outlet either in the lower conical region or at the level of the settled bed.

The presence of a draft tube encourages spouting and eases scale-up to larger vessels. The Venturi draft tube (VDT) further encourages spouting, eases scale-up, reduces the particle cycle time, and reduces dead zones in the conical region known to exist at larger scales thereby narrowing the cycle time distribution (CTD).

It is well known through many empirical and analytical studies of spouted bed hydrodynamics that the ratio of the inlet diameter $D_i$ to the particle diameter $d_p$ cannot exceed about 25 for stable spouting, $D_i/d_p < 25$. Furthermore the optimum ratio of vessel diameter to inlet diameter $D_c/D_i$ is said to be 6 to 10 with a maximum of 12 for stability and to avoid dead zones (Epstein, N.; Grace, J. R., Spouted and Spout-Fluid Beds: Fundamentals and Applications. Cambridge University Press: 2010). Combining those two constraints yields:

$$\frac{D_c}{d_p} = \frac{D_c}{D_i} \times \frac{D_i}{d_p} \leq 300$$

Therefore the diameter of the bed should not exceed 300 times the particle diameter. This observation has been borne out in previous studies of industrial scale spouted beds; spouted beds are typically used for particles in the 1-3 mm range and almost never exceed 1 m in vessel diameter. Because of this limitation, industrially relevant spouted beds are limited to fairly coarse particles.

Draft tubes have been shown to ease the scalability constraints for spouted beds. Chandnani and Epstein (Chandnani, P.; Epstein, N. *In Spoutability and Spout Destabilization of Fine Particles with a Gas*, Proceedings of Fluidization V, 18-23, May 1986; Engineering Foundation: 1986; pp. 233-240) showed that stable spouting could be achieved with a draft tube spouted bed (DTSB) with a $D_i/d_p$ ratio up to 66.7, a nearly three-fold improvement over the conventional spouted bed without a draft tube. Nevertheless, further improvements are needed to process fine coal particles and the like. Altzibar et al. (*Study of the Minimum Spouting Velocity in a Drain-tube Conical Spouted Bed*, The 13th International Conference on Fluidization—New Paradigm in Fluidization Engineering, 2010) noted that:

> A crucial parameter that limits the scaling up of spouted beds is the ratio between the inlet diameter and particle diameter. In fact, the inlet diameter should be smaller than 20-30 times the average particle diameter in order to achieve spouting status. The use of a draft-tube is the usual solution to this problem. Nevertheless, solid circulation, particle cycle time, gas distribution and so on, are governed by the space between the bottom of the bed and the draft-tube.

The VDTSB has improved hydrodynamics in the entrainment zone in the base of the cone between the bottom of the bed and the draft tube. The concept essentially introduces an eductor into the draft tube. The jet of the spouted bed is used as the motive fluid in the eductor and the Venturi geometry in the draft tube accelerates the fluid (with minimal total pressure loss) to create additional suction in the entrainment zone. The additional suction draws particles radially inward to reduce the cycle time and eliminate dead zones. Both effects ease scale-up, which is limited by the appearance of dead zone that broaden the CTD and long cycle times that before now have led to unacceptable hold up of material in the dense annular region where mass transfer is slow.

A currently preferred embodiment of our invention contemplates that the VDTSB can be used for thermal desorption of mercury from coal. Bench-scale analytical mercury speciation studies have demonstrated thermal desorption; however, this method has not been applied to industrial-scale systems to pre-treat coal. A specialized desorber design would be required with high throughput, tolerance for a fairly wide particle size distribution, good heat and mass transfer, and robustness. A Venturi spouted bed desorber tailored for coal feedstocks could achieve conditions that promote thermal desorption of mercury species (primarily occurring in the range 170-300° C.) and meet the aforementioned requirements. Pulverized coal, which ranges in size from 10 to 500 µm and is usually less than 100 µm (Jiménez, S.; Ballester, J., *Study of the Evolution of Particle Size Distributions and its Effects on the Oxidation of Pulverized Coal*. Combustion and Flame 2007, 151 (3), 482-494). For the prior art spouted beds, this particle size would limit the diameter of the spouted bed to be less than 30 mm. Clearly, this limitation on the scale of prior art spouted beds makes them impractical for coal-fired boilers typically consuming coal at a rate on the order of 10 metric tons per hour or more.

An object of the present invention is to increase the throughput and scalability of spouted bed systems by improving radial solids transport within the entrainment zone of the draft tube by incorporating a Venturi nozzle.

A further object of this invention is to improve the solids-turnover rate with tailored spouted bed and draft tube geometries for feedstocks with a wide particle size distribution.

The present invention improves on conventional spouted beds by incorporating a draft tube with a converging-diverging Venturi nozzle to provide suction near the draft tube inlet and increase the flow rate of solids into the high-velocity motive fluid stream with a consequent reduction in the propensity for dead zones at the bottom of the narrow conical section.

The present invention adapts to different particle sizes, flow rates, and feedstock with the ability to quickly interchange nozzle and draft tube diameters. The length between the nozzle inlet and the bottom of the draft tube is "tunable", i.e., selectively variable to accept a wide range of particle sizes, particle shapes, and particle material properties.

Other objects, advantages and novel features of the present invention will become apparent from the following detailed description when considered in conjunction with the accompanying drawings and non-limiting example herein.

DETAILED DESCRIPTION OF THE DRAWINGS

Figure 1:
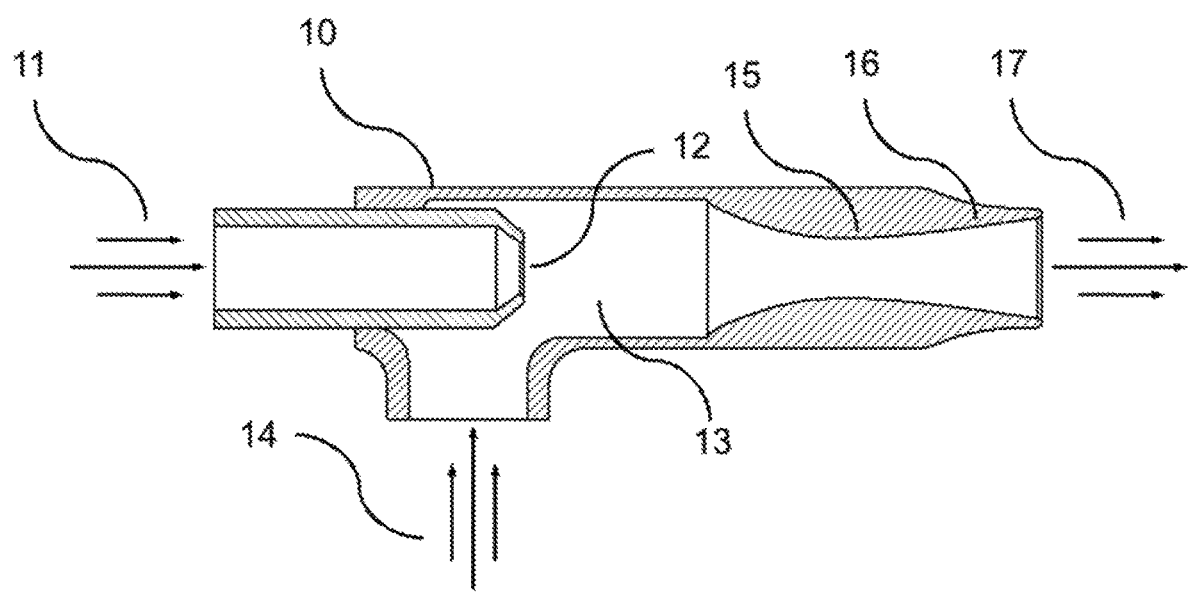
FIG. 1 is a schematic view of a conventional eductor system and location of the motive fluid nozzle.

Referring now to FIG. 1, components of a typical eductor designated generally by numeral 10 with motive fluid nozzle 12, converging induction zone 13, Venturi throat 15, and Venturi diffuser 16 are shown. Motive gas 11 enters the eductor system 10 as a low velocity, high pressure stream. The stream is accelerated through the motive nozzle 12 converting the stream into a high velocity, lower pressure stream. As the stream enters the converging induction zone 138, the low pressure creates suction on a dispersed solid or liquid stream 14 entraining the liquid or solid particles. The two streams mix and move through the Venturi throat 15. The mixture moves through the diffuser 16, substantially recovering the original static pressure at the exit 17 compared to the Venturi inlet 13.

Figure 2:
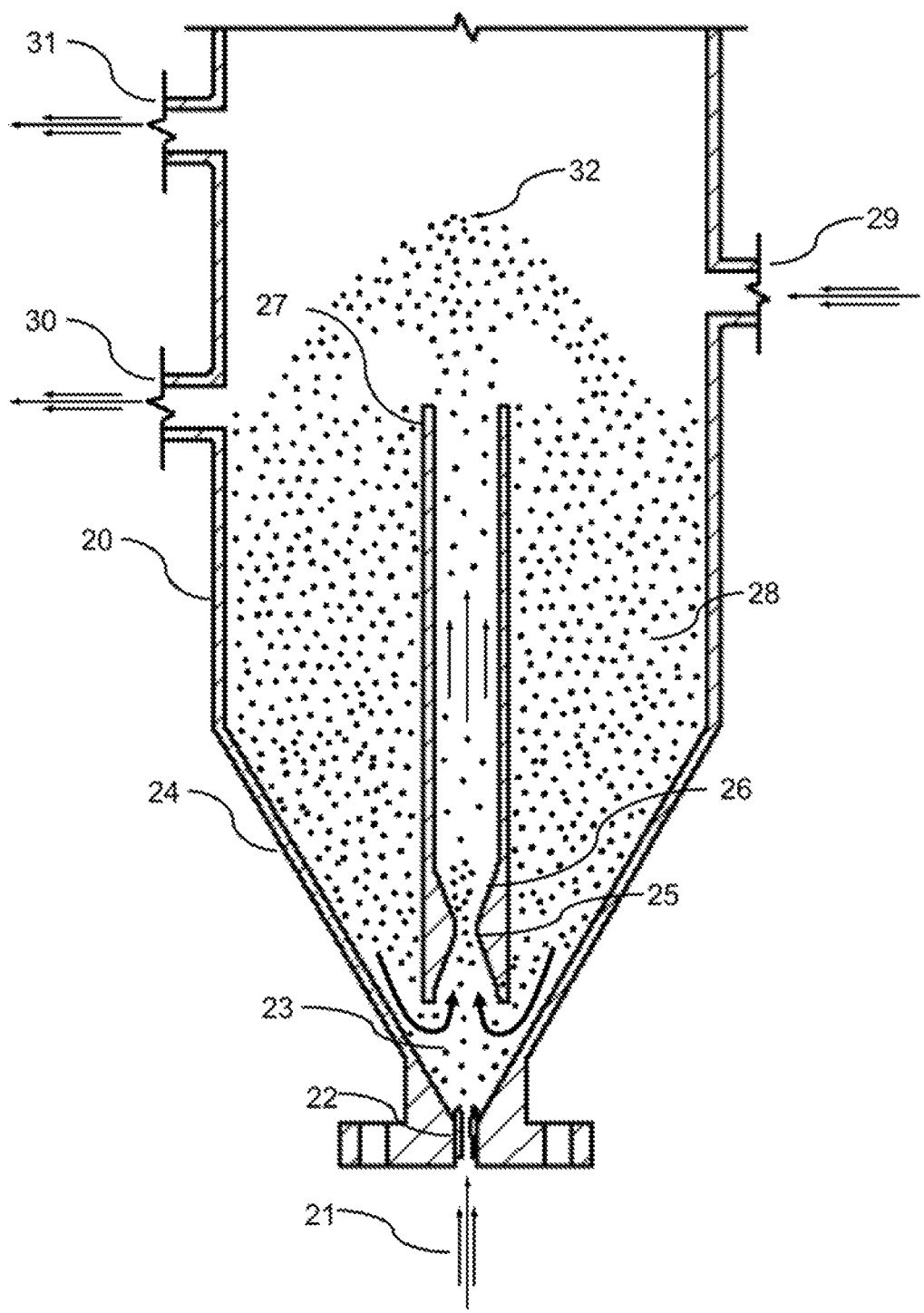
FIG. 2 is a schematic partial view of the VDTSB system that illustrates the orientation and configuration of the motive fluid nozzle, suction or entrainment zone and Venturi nozzle draft tube according to our invention, with movement of fluidizing gas and solids within the reactor being depicted.

Referring to FIG. 2, relevant components of the VDTSB designated generally by numeral 20 are shown, and the flow of gas and solid particles is described. The high pressure motive gas 21 enters the inlet and is accelerated through the motive nozzle 22 converting the gas into a low static pressure, high velocity stream. Optionally, the motive nozzle 22 can have a different diameter than the pipe carrying the motive gas 21 into the spouted bed 20. The motive gas 21 enters the entrainment zone 23 where the lower pressure causes a suction effect on the particles in the spouted bed annular conical section 24, driving the particles down the conical region in section 24 and entraining the particles in the motive gas 21. As shown by the heavy arrows, the solid/gas mixture is advected into the Venturi throat 25 by suction and drag forces. The solid/gas mixture then enters the Venturi diffuser 26 where the stream is efficiently converted from a high velocity, low static pressure stream back into a lower velocity, higher static pressure stream to carry the particles up the draft tube 27. The draft tube 27 maintains the stability of the spouting regime within the bed over a range of flow rates, bed heights, and particle sizes. The solid/gas mixture exits the top of the draft tube 27 in a fountain or spout 32 into the freeboard region on top of the settled bed where the particles begin to move down the annulus of the cylindrical section 28 of the vessel. This cycle of particle motion repeats until the particles are removed from the spouted bed 20. Particles optionally enter the VDTSB through a pipe 29 near the top of the settled bed where they move down the annulus 28 following the downward movement of the rest of the particles. As the settled bed height raises with increased particle mass being fed into the spouted bed 20, the particles will reach a level higher than the particle outlet pipe 30, where they will spill out and exit the spouted bed 20. The motive gas 21 above the spouting region 32 leaves the reactor through the gas exit pipe 31 near the top of the spouted bed 20.

Figure 3:
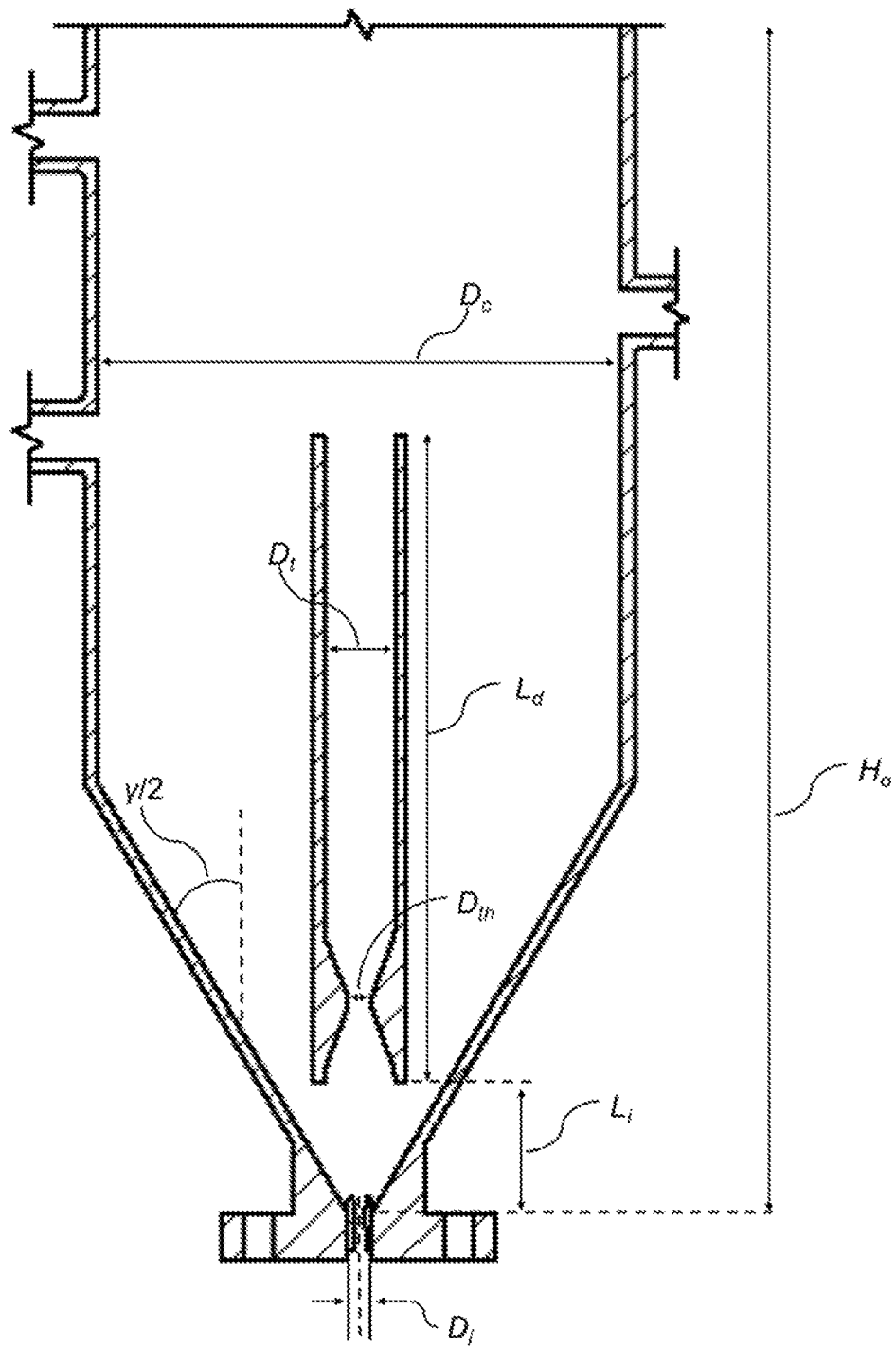
FIG. 3 is a cross-sectional partial view of the VDTSB of FIG. 2 showing key physical dimensions for the spouted bed and draft tube used for scaling the equipment for feedstocks with various particle sizes.

Referring now to FIG. 3, the relevant geometric parameters for the VDTSB of FIG. 2 are shown. The motive gas passes through an inlet of diameter $D_i$ and the resulting jet spans an inlet length $L_i$, both of which are tunable and adjustable, before entering the draft tube of diameter $D_t$ and length $L_d$. The draft tube in the VDTSB contains a Venturi with a throat diameter $D_{th}$. The spout of the solid/gas mixture exits the draft tube above the bed height $H_o$ into the cylindrical section of the vessel of diameter $D_o$. The particles cycle back to the inlet of the spout through the conical section of total included angle γ or half-angle of γ/2. We have found that the aforementioned parameters are important to produce stable spouting for a specific particle size or range of particle sizes. For example, $D_{th}$ affects the amount of suction produced by the Venturi. Selection of $D_{th}$ and $D_i$ also depends on the particle size and likelihood of clogging the narrow passages.

Example—Flow Visualization of Spouted Bed with Venturi Draft Tube

Figure 4A:
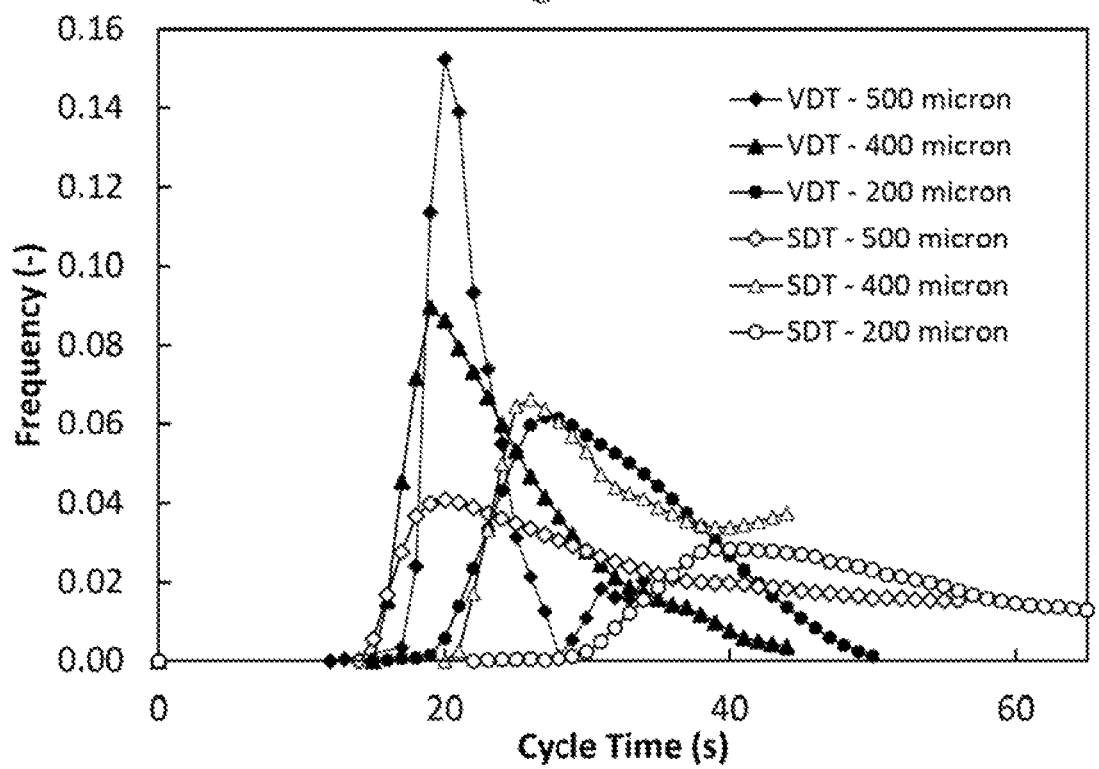
FIGS. 4A and 4B are, respectively, the cycle time distribution (CTD) and average cycle time measured for the Venturi draft tube (VDT) and straight draft tube (SDT) spouted bed with average particle sizes of 200, 400, and 500 µm for a motive gas flow rate of 10 L/min.
Figure 4B:
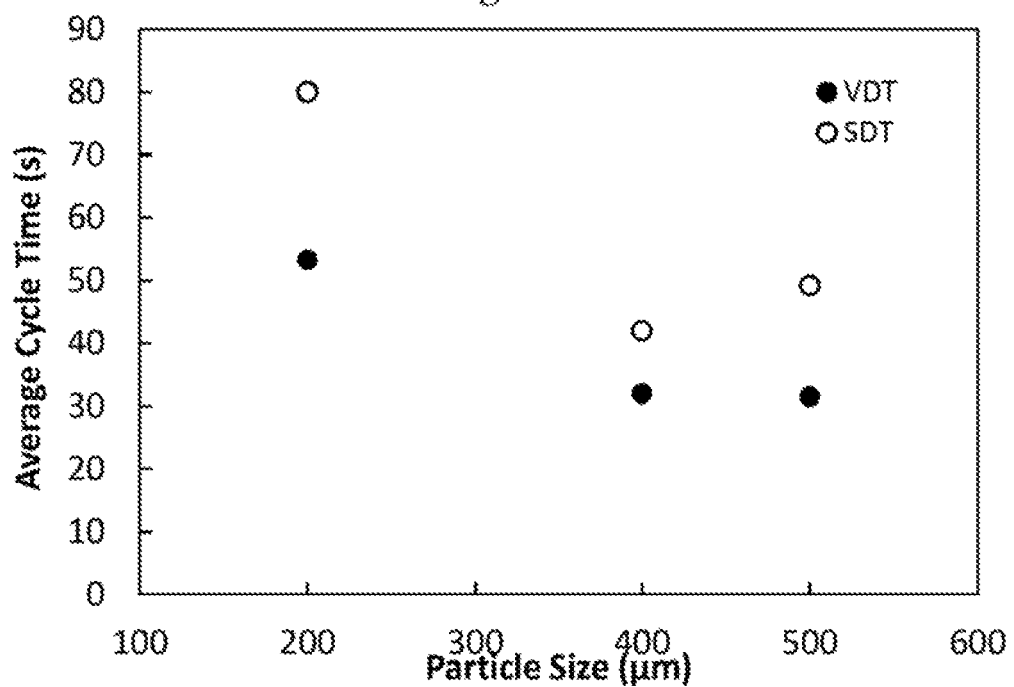

An example of this invention is depicted in FIGS. 4A and 4B, where the cycle time distribution (CTD) and average cycle time are shown for the Venturi draft tube (VDT) and conventional straight draft tube (SDT) spouted bed at a fixed flow rate. The cycle time is the amount of time required for a single particle within the bed to pass from the top of the bed down through the bed until it is entrained within the draft tube. Tracer particles were introduced at the top of the bed (10:1 bed material to tracer particle ratio) for each particle size, motive gas flow rate, and draft tube configuration. The tracer particle concentration was determined by high-resolution camera imaging of the pixel intensity throughout a clear, slot-rectangular spouted bed over time. Pixel intensity measurements over position and time were correlated with tracer particle concentrations. Over the range of particle sizes, the VDT shifts the weighted-average cycle time substantially lower and with a more uniform distribution. For 200 μm particles, the weighted-average cycle time was 32±2.3 s for the VDT and 56 & 3.7 s for the SDT (i.e., a 43% reduction in cycle time). The average cycle time was 25±2.2 s for the VDT and 32±2.3 s for the SDT using 400 μm (i.e., the cycle time reduced by 14%). Comparably, for 500 μm particles, the cycle times were 18±1.9 s for the VDT and 32±3.1 s for the SDT (a 26% reduction in cycle time). Under these conditions, the VDT substantially lowered the cycle time, resulting in a spouted bed that can handle a higher throughput of finer particles.

While we have shown and described a currently preferred embodiment in accordance with our invention, it should be understood that the same is susceptible to further changes and modifications without departing from the scope of our invention. Therefore, we do not want to be limited to the details shown and described herein but intend to cover all such changes and modifications as are encompassed by the scope of the appended claims.

We claim:

1. An apparatus for improved fluid-solid contacting, comprising a vessel having a fluid inlet at a bottom region thereof for introduction of a motive gas and configured to entrain solid particles, and a draft tube operatively arranged above the fluid inlet and having a portion with Venturi-shaped geometry section downstream from the fluid inlet, and an exit for the draft tube in or near the freeboard section of the vessel above the settled bed, and an annular region for recirculation of the solid particles back to the bottom region wherein an inlet diameter $D_1$, for introduction of the motive gas prior to entering the draft tube having a diameter $D_t$ and length $L_d$ and an exit for a spout of solid/gas mixture located at a height $H_o$ above the bottom region, a diameter $D_{th}$ of the draft tube throat in the Venturi-shaped geometry section are selected based on the size of solid particles and flow rate of the motive gas.

2. The apparatus of claim 1, wherein the Venturi-shaped geometry section is located axially based on the size of solid particles and flow rate of the motive gas.

3. The apparatus of claim 1, wherein the vessel and draft tube are arranged to receive the solid particles consisting of coal containing mercury, and recirculate the solid particles within the bed as mercury is removed.

4. The apparatus of claim 1, wherein the draft tube is comprised of one of a porous, or a solid material.

5. The apparatus of claim 1, wherein the vessel has a particle inlet and outlet for continuous operation.

* * * * *